United States Patent
Li

(10) Patent No.: US 8,275,932 B2
(45) Date of Patent: Sep. 25, 2012

(54) METHOD FOR TRANSMITTING SPECIAL COMMANDS TO FLASH STORAGE DEVICE

(75) Inventor: Wei-Qing Li, Shanghai (CN)

(73) Assignee: Silicon Motion, Inc., Jhubei (TW)

( * ) Notice: Subject to any disclaimer, the term of this patent is extended or adjusted under 35 U.S.C. 154(b) by 489 days.

(21) Appl. No.: 12/539,099

(22) Filed: Aug. 11, 2009

(65) Prior Publication Data

US 2010/0211722 A1    Aug. 19, 2010

(30) Foreign Application Priority Data

Feb. 18, 2009  (TW) ............................... 98105069 A

(51) Int. Cl.
*G06F 12/00* (2006.01)
*G11C 16/10* (2006.01)

(52) U.S. Cl. ................ 711/103; 711/115; 711/E12.008; 707/824; 707/E17.01

(58) Field of Classification Search ........................ None
See application file for complete search history.

(56) References Cited

U.S. PATENT DOCUMENTS

| | | | | |
|---|---|---|---|---|
| 6,405,362 | B1 * | 6/2002 | Shih et al. | 717/174 |
| 7,853,388 | B2 * | 12/2010 | Wang | 701/81 |
| 2006/0136676 | A1 * | 6/2006 | Park et al. | 711/144 |
| 2009/0106486 | A1 * | 4/2009 | Kim et al. | 711/103 |
| 2009/0172269 | A1 * | 7/2009 | Song et al. | 711/103 |
| 2009/0292839 | A1 * | 11/2009 | Oh | 710/55 |
| 2010/0088462 | A1 * | 4/2010 | Kuo et al. | 711/103 |
| 2010/0186077 | A1 * | 7/2010 | Chang et al. | 711/103 |

* cited by examiner

*Primary Examiner* — Jasmine Song
*Assistant Examiner* — Daniel Bernard
(74) *Attorney, Agent, or Firm* — Wang Law Firm, Inc.; Li K. Wang; Stephen Hsu

(57) ABSTRACT

The invention provides a data storage system. In one embodiment, the data storage system comprises a host and a flash storage device. The host sends a series of first access commands for accessing a plurality of special files to the flash storage device. The flash storage device having the stored plurality of special files and a command-symbol mapping table, sequentially generates a plurality of first digits respectively corresponding to the special files accessed by the first access commands to obtain a first data stream, converts the first data stream to a plurality of first special commands according to the command-symbol mapping table, and performs operations according to the first special commands. Each of the special files corresponds to a digit, the command-symbol mapping table records a corresponding relationship between a plurality of symbols and a plurality of special commands, and each of the symbols comprises a plurality of digits.

18 Claims, 6 Drawing Sheets

350

| Command-symbol mapping table |||
|---|---|---|
| Symbol | Special command | Transmitting sequence |
| 00 | First special command | Special-file-0 writing, Special-file-0 writing |
| 01 | Second special command | Special-file-0 writing, Special-file-1 writing |
| 02 | Third special command | Special-file-0 writing, Special-file-2 writing |
| . . . | . . . | . . . |
| 18 | Password transmission | Special-file-1 writing, Special-file-8 writing |
| . . . | . . . | . . . |
| 99 | End of data transmission | Special-file-9 writing, Special-file-9 writing |

| Special file Name | Digit |
|---|---|
| Special file 0 | 0 |
| Special file 1 | 1 |
| Special file 2 | 2 |
| Special file 3 | 3 |
| Special file 4 | 4 |
| Special file 5 | 5 |
| Special file 6 | 6 |
| Special file 7 | 7 |
| Special file 8 | 8 |
| Special file 9 | 9 |

| Command-symbol mapping table ||| 
|---|---|---|
| Symbol | Special command | Transmitting sequence |
| 00 | First special command | Special-file-0 writing, Special-file-0 writing |
| 01 | Second special command | Special-file-0 writing, Special-file-1 writing |
| 02 | Third special command | Special-file-0 writing, Special-file-2 writing |
| ⋮ | ⋮ | ⋮ |
| 18 | Password transmission | Special-file-1 writing, Special-file-8 writing |
| ⋮ | ⋮ | ⋮ |
| 99 | End of data transmission | Special-file-9 writing, Special-file-9 writing |

METHOD FOR TRANSMITTING SPECIAL COMMANDS TO FLASH STORAGE DEVICE

CROSS REFERENCE TO RELATED APPLICATIONS

This Application claims priority of Taiwan Patent Application No. 98105069, filed on Feb. 18, 2009, the entirety of which is incorporated by reference herein.

BACKGROUND OF THE INVENTION

1. Field of the Invention

The invention relates to memories, and more particularly to flash memory device.

2. Description of the Related Art

A flash memory is a non-volatile memory that can be electrically erased and reprogrammed. Flash memories are primarily used in memory cards and USB flash drives for general storage and transfer of data between computers and other digital products. A flash memory costs far less than an EEPROM and therefore has become a dominant memory device applied in electronic products. Examples of applications include Personal Digital Assistants (PDA) and laptop computers, digital audio players, digital cameras and mobile phones.

A data storage device comprising a flash memory that stores data for a host is referred to as a flash storage device, or a memory card. The flash storage device is coupled to a host. The host may be a computer, a digital camera, or an MP3 player. When the host wants to access the flash memory, the host sends commands to the flash storage device. A controller of the flash storage device then accesses the flash memory according to the commands sent by the host.

In some applications, the host may request the flash storage device to perform specialized operations which can only be started by a specific method. For example, a manufacturer of flash storage devices may perform self-test operations of the flash storage devices for verifying the functions of the flash storage devices. Accordingly, the self-test operation of the flash storage devices should not be performed by general users. Additionally, a self-repair operation may be required by a manufacturer of flash storage devices for faulty flash storage devices. Similarly, the self-repair operation should not be performed by general users. To perform the specialized operations, the host must perform the specialized operations of the flash storage devices by a specific method, thus preventing the specialized operations from being performed by general users. A method for transmitting specialized commands to a flash storage device is therefore required.

BRIEF SUMMARY OF THE INVENTION

The invention provides a method for transmitting commands to a flash storage device. In one embodiment, the flash storage device is coupled to a host. First, a plurality of special files is stored in the flash storage device, wherein each of the special files corresponds to a digit. A command-symbol mapping table is stored in the flash storage device, wherein the command-symbol mapping table records a corresponding relationship between a plurality of symbols and a plurality of special commands, and each of the symbols comprises a plurality of digits. Before the host transmits a plurality of special commands to the flash storage device, a series of first access commands to access the special files is sent to the flash storage device. The flash storage device then sequentially generates a plurality of first digits respectively corresponding to the special files accessed by the first access commands to obtain a first data stream. The flash storage device then converts the first data stream to a plurality of first special commands according to the command-symbol mapping table. Finally, the flash storage device performs operations according to the first special commands.

The invention provides a flash storage device. In one embodiment, the flash storage device is coupled to a host, and comprises a controller and a flash memory. The flash memory has a plurality of special files and a command-symbol mapping table stored therein, wherein each of the special files corresponds to a digit, the command-symbol mapping table records a corresponding relationship between a plurality of symbols and a plurality of special commands, and each of the symbols comprises a plurality of digits. The controller receives a plurality of access commands from the host. When the access commands request the flash storage device to access the special files, the controller sequentially generates a plurality of first digits respectively corresponding to the special files accessed by the access commands to obtain a first data stream, converts the first data stream to a plurality of first special commands according to the command-symbol mapping table, and performs operations according to the first special commands.

The invention provides a data storage system. In one embodiment, the data storage system comprises a host and a flash storage device. The host sends a series of first access commands to access a plurality of special files to the flash storage device. The flash storage device stores a plurality of special files and a command-symbol mapping table, sequentially generates a plurality of first digits respectively corresponding to the special files accessed by the first access commands to obtain a first data stream, converts the first data stream to a plurality of first special commands according to the command-symbol mapping table, and performs operations according to the first special commands. Each of the special files corresponds to a digits the command-symbol mapping table records a corresponding relationship between a plurality of symbols and a plurality of special commands, and each of the symbols comprises a plurality of digits.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3A shows an embodiment of digits corresponding to the special files according to the invention;

FIG. 3B shows an embodiment of a command-symbol mapping table according to the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
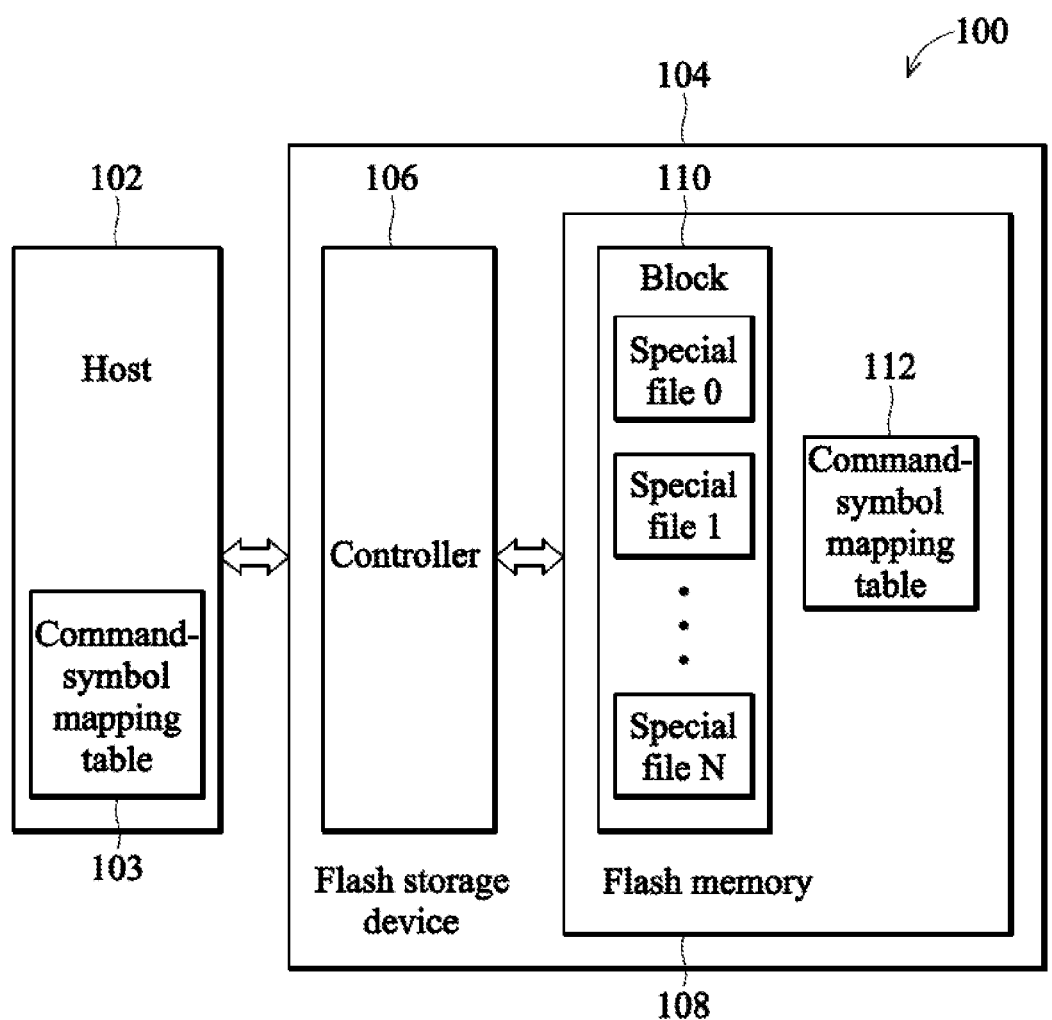
FIG. 1 is a block diagram of a data storage system according to the invention.

Referring to FIG. 1, a block diagram of a data storage system 100 according to the invention is shown. In one embodiment, the data storage system 100 comprises a host 102 and a flash storage device 104. In one embodiment, the host 102 is a computer, and the flash storage device 104 is a memory card. The flash storage device 104 comprises a controller 106 and a flash memory 108. The flash memory 108 has a plurality of special files 0~N stored therein, and each of the special files 0~N corresponds to a digit. In one embodiment, the special files 0~N is stored in a block of the flash memory 108. Referring to FIG. 3A, an embodiment of digits corresponding to the special files 0~N according to the invention is shown. The special files 0, 1, 2, ..., 8, and 9 respectively correspond to digits 0, 1, 2, ..., 8, and 9. The digits corresponding to the special files 0~9 therefore cover all the decimal digits 0~9.

The controller 106 manages data access of flash memory 108. Before the host 102 accesses data stored in the flash memory 108, the host 102 first sends access commands to the controller 106. The controller 106 then accesses the flash memory 108 according to the access commands sent by the host 102. For example, when the access commands are write commands, the controller 106 writes data received from the host 102 to the flash memory 108 according to logical addresses sent by the host 102. When the access commands are read commands, the controller 106 reads data from the flash memory 108 according to logical addresses sent by the host 102, and then delivers the data to the host 102.

In addition to general access commands for accessing data stored in the flash memory 108, the flash storage device 104 can further accept special commands sent from the host 102 and then perform operations corresponding to the special commands. To transmit the special commands to the flash storage device 104, the host 102 sends access commands for accessing the special files 0~N to the flash storage device 104 rather than directly sending the special commands. The flash storage device 104 does not physically access the special files 0~N according to the access commands. Instead, the flash storage device 104 converts the access commands to the special commands and then performs operations corresponding to the special commands. The steps of sending the access commands are further illustrated with FIG. 4, and the steps of converting the access commands to the special commands are illustrated with FIG. 5.

Figure 2:
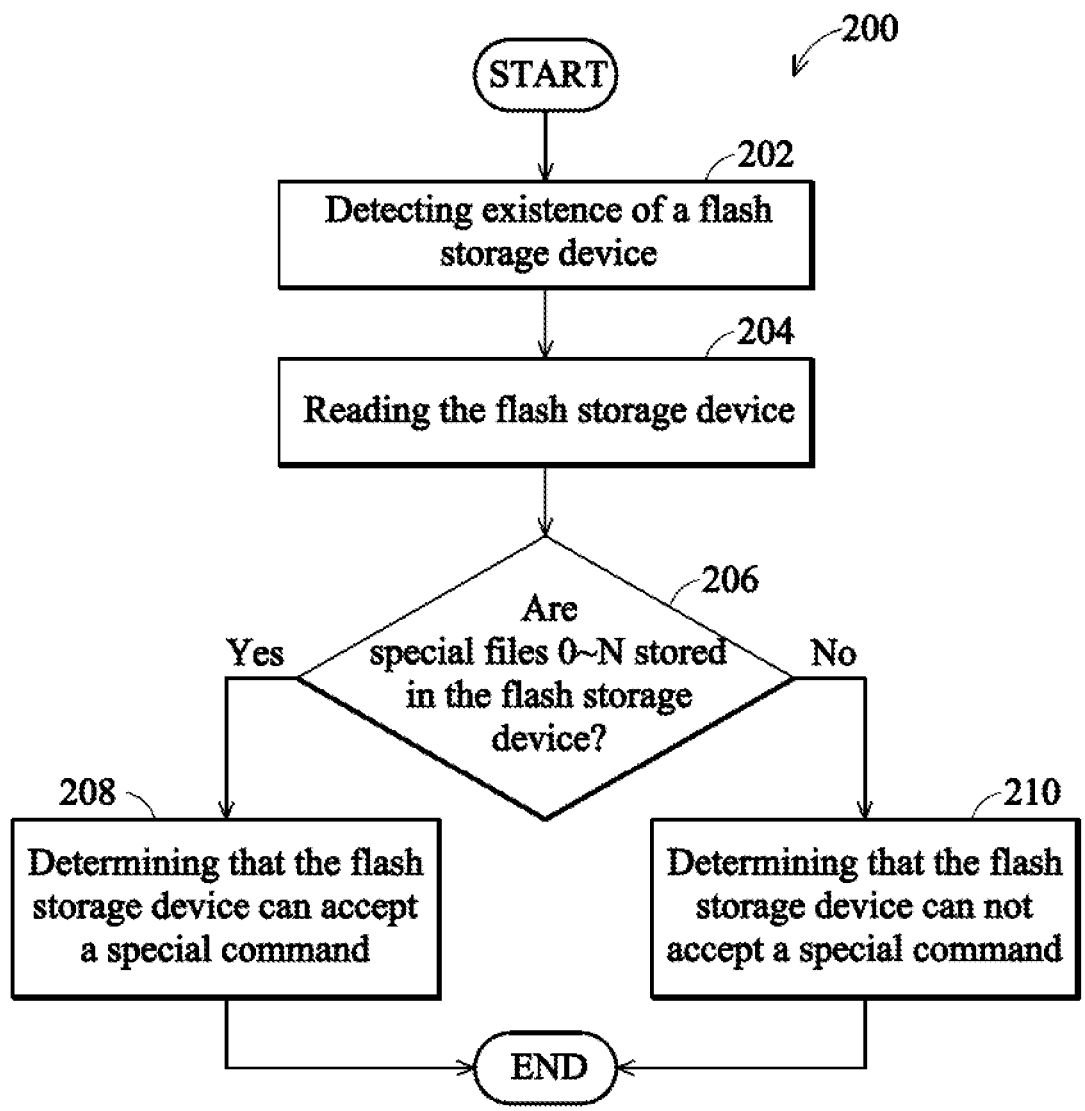
FIG. 2 is a flowchart of a method for determining whether a flash storage device is able to accept special commands according to the invention.

Referring to FIG. 2, a flowchart of a method 200 for determining whether a flash storage device is able to accept special commands according to the invention is shown. When a flash storage device 104 is coupled to a host 102, the host 102 must first determine whether the flash storage device 104 is able to accept special commands. If the flash storage device 104 is not able to accept special commands, the flash storage device 104 does not perform operations corresponding to the special commands. When the host 102 detects existence of the flash storage device 102 (step 202), the host 102 first reads the flash storage device 104 (step 204) to determine whether the flash storage device 104 has a plurality of special files 0~N (step 206) stored therein. In one embodiment, the host 102 compares file names read from the flash storage device 104 with the names of the special files 0~N to determine whether the flash storage device 104 has the special files 0~N stored therein. If the flash storage device 104 has the special files 0~N stored therein, the host 102 determines that the flash storage device 104 can accept special commands (step 208).

If the flash storage device 104 does not have the special files 0~N stored therein, the host 102 determines that the flash storage device 104 can not accept special commands (step 210).

In one embodiment, the host 102 and the flash memory 110 respectively store command-symbol mapping table 103 and 112 as references for sending or receiving special commands. Referring to FIG. 3B, an embodiment of a command-symbol mapping table 350 according to the invention is shown. The command-symbol mapping table 350 records a corresponding relationship between a plurality of symbols and a plurality of special commands. In addition, each of the symbols comprises a fixed number of digits. Assume that each symbol comprises two decimal digits. Because the two decimal digits have 10×10=100 different combinations, the two decimal digits can represent 100 special commands in total. For example, a symbol 18 comprises digits 1 and 8 in the command-symbol mapping table 350 indicates a password-transmission special command. For another example, a symbol 99 comprises digits 9 and 9 in the command-symbol mapping table 350 indicates an end-of-transmission special command.

Figure 4:
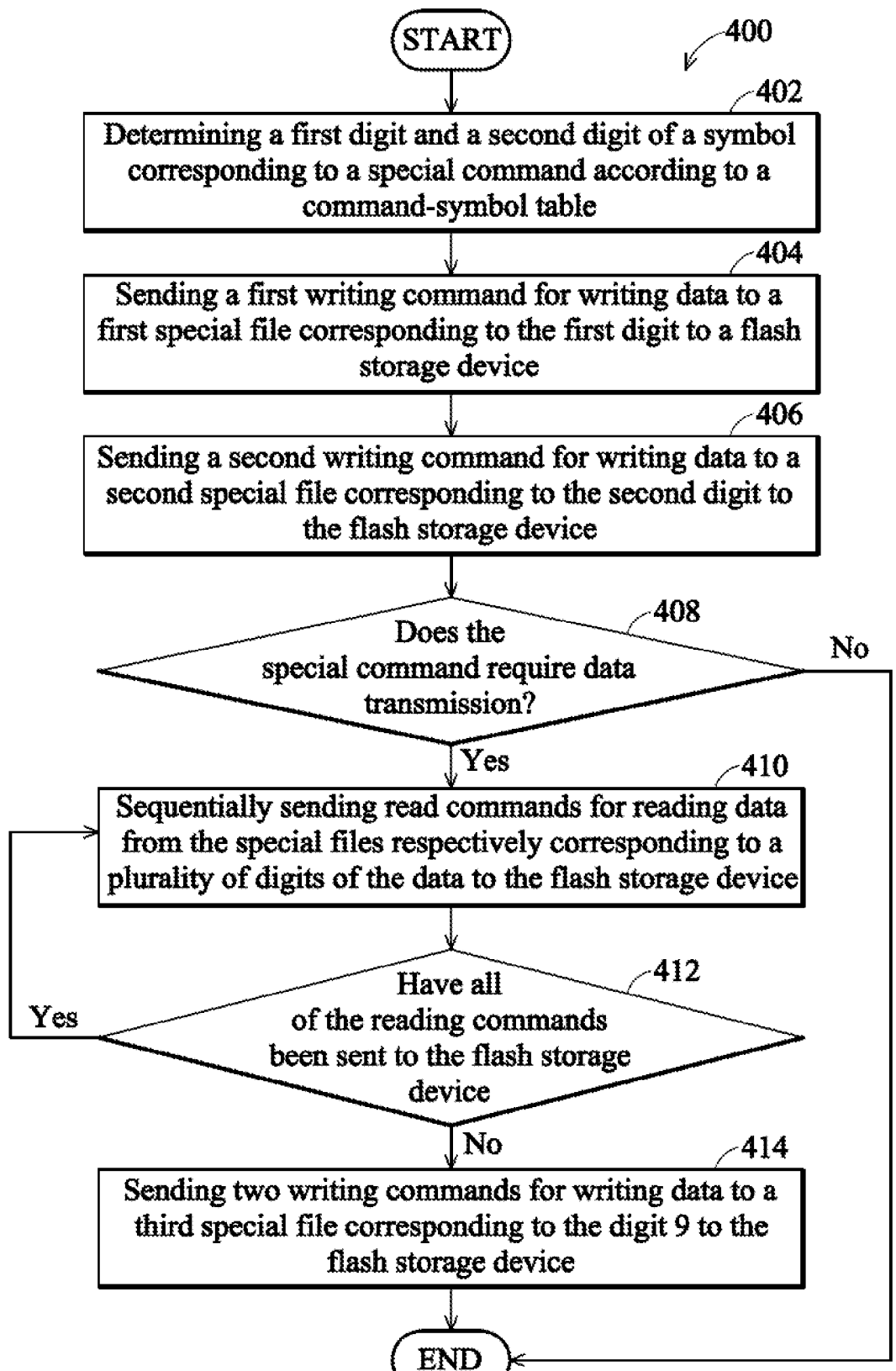
FIG. 4 is a flowchart of a method for transmitting special commands to a flash storage device according to the invention.

Referring to FIG. 4, a flowchart of a method 400 for transmitting special commands to a flash storage device 104 according to the invention is shown. To send a special command to the flash storage device 104, the host 102 sends a series of access commands for accessing the special files 0~9 to the flash storage device 104. First, the host 102 converts a special command to a corresponding symbol according to the command-symbol mapping table 350 shown in FIG. 3B, wherein the symbol comprises a first digit and a second digit (step 402). The host 102 then sends a first writing command for writing data to a first special file corresponding to the first digit to the flash storage device 104 (step 404). The host 102 then sends a second writing command for writing data to a second special file corresponding to the second digit to the flash storage device 104 (step 406).

If the special command does not request the host 102 to transmit data to the flash storage device 104 (step 408), transmission of the special command is completed. Otherwise, if the special command requests the host 102 to transmit data to the flash storage device 104 (step 408), the host 102 sequentially sends a plurality of read commands for reading data from the special files 0~9 respectively corresponding to a plurality of digits of the transmitted data to the flash storage device 104 (step 410). After all of the reading commands have been sent to the flash storage device 104 (step 412), the host 102 then sends a third writing command and a fourth writing command for writing data to the special file 9 corresponding to the digit 9 to the flash storage device 104 (step 414), thus informing the flash storage device 104 that the data transmission has ended. In the method 400, the host 102 transmits a symbol of a special command by sending writing commands to the flash storage device 104, and transmits data of the special command by sending reading commands to the flash storage device 104. In another embodiment, the host 102 transmits a symbol of a special command by sending reading commands to the flash storage device 104, and transmits data of the special command by sending writing commands to the flash storage device 104.

For example, assume that the host 102 will transmit a password transmission special command corresponding to the symbol 18 shown in FIG. 3B to the flash storage device 104, the host 102 would first send a writing command for writing data to the special file 1 corresponding to the digit 1 to the flash storage device 104 (step 404), and then send a writing command for writing data to the special file 8 corresponding to the digit 8 to the flash storage device 104 (step

406). Assume the password carried by the password transmission special command is 9876. The host 102 would then sequentially send reading commands for reading the special files 9, 8, 7, and 6 respectively corresponding to the digits 9, 8, 7, and 6 of the password (step 410). Finally, the host 102 sequentially sends two writing commands for writing data to the special file 9 corresponding to the digit 9 to the flash storage device 104 (step 414), thus informing the flash storage device 104 that data transmission has ended.

Figure 5:
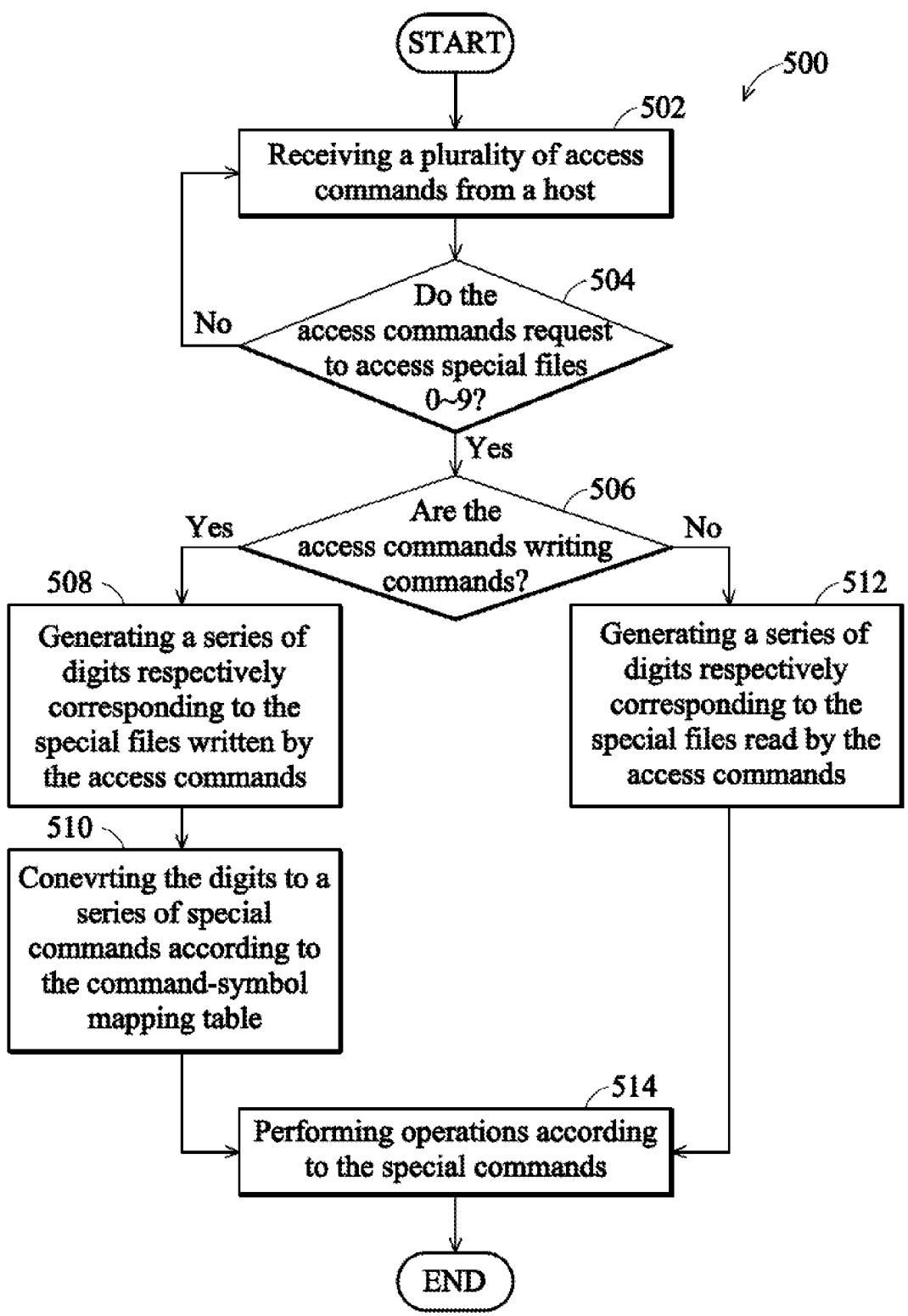
FIG. 5 is a flowchart of a method for receiving the special commands sent by a host according to the invention.

Referring to FIG. 5, a flowchart of a method 500 for receiving the special commands sent by a host 102 according to the invention is shown. When the flash storage device 104 receives access commands accessing the special files 0~9 from the host 102, the flash storage device 104 convert the access commands to special commands, and performs operations corresponding to the special commands. First, the controller 106 of the flash storage device 104 receives a plurality of access commands from the host 102 (step 502). The controller 106 then determines whether the access commands request the flash storage device 104 to access the special files 0~9 (step 504). When the access commands do not request the flash storage device 104 to access the special files 0~9, the controller 106 then normally accesses the flash memory 108 according to the access commands. When the access commands request the flash storage device 104 to access the special files 0~9, the controller 106 then determines whether the access commands are writing commands which request the flash storage device 104 to write data to the flash memory 110 (step 506).

When the access commands are writing commands (step 506), the controller 106 determines whether the host 102 has sent a symbol of a special command via the writing commands. The controller 106 therefore generates a series of digits respectively corresponding to the special files written by the access commands (step 508), and then converts the digits to special commands according to the command-symbol mapping table 112 (step 510). In one embodiment, the controller 106 slices the series of digits according to a digit number to obtain the series of symbols, and then converts the symbols to the series of special commands according to the command-symbol mapping table, wherein the digit number indicates the number of digits contained in a symbol. Otherwise, when the access commands are reading commands (step 506), the controller 106 determines that the host 102 has sent data carried by a special command via the reading commands. The controller 106 therefore generates a series of digits respectively corresponding to the special files read by the access commands as output data (step 512). Finally, the controller 106 performs operations corresponding to the special commands (step 514).

For example, assume that the flash storage device 104 receives 6 access commands for accessing the special files from the host 102, and the 6 access commands comprise two writing commands requesting that the flash storage device 104 to write data to the special files 1, and 8, and four reading commands requesting that the flash storage device 104 read data from the special files 9 8, 7, and 6. The controller 102 therefore generates digits 1 and 8 corresponding to the special files 1 and 8 (step 508) and then converts the symbol containing the digits 1 and 8 to the password transmission special command according to the command-symbol mapping table 350 (step 510). The controller 106 then generates the digits 9, 8, 7, and 6 corresponding to the special files 9, 8, 7, and 6 as password data 9876 carried by the password transmission special command (step 512). Finally, the controller 106 compares whether the received password data 9876 is identical to a predetermined password. If the received password data 9876 is identical to the predetermined password, the flash storage device 104 allows the host 102 to access all data stored in the flash memory 110.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for transmitting commands to a flash storage device, wherein the flash storage device is coupled to a host, comprising:
   storing a plurality of predetermined files in the flash storage device, wherein each of the predetermined files corresponds to a digit;
   storing a command-symbol mapping table in the flash storage device, wherein the command-symbol mapping table records a corresponding relationship between a plurality of symbols and a plurality of predetermined commands, and each of the symbols comprises a plurality of digits;
   the host sending a series of first access commands for accessing the predetermined files to the flash storage device;
   the flash storage device sequentially generating a plurality of first digits respectively corresponding to the predetermined files accessed by the first access commands to obtain a first data stream;
   the flash storage device slicing the first data stream to generate a plurality of first symbols according to a digit number indicating the number of digits comprised by a symbol;
   the flash storage device converting the first symbols to a plurality of first predetermined commands according to the command-symbol mapping table; and
   the flash storage device performing operations according to the first predetermined commands.

2. The method as claimed in claim 1, wherein conversion of the first data stream to generate the first predetermined commands comprises:
   when the first access commands request the flash storage device to write data to the predetermined files, the flash storage device converting the first data stream to the first symbols, and converting the first symbols to the first predetermined commands according to the command-symbol mapping table; and
   when the first access commands request the flash storage device to read data from the predetermined files, the flash storage device converting the first data stream to first data.

3. The method as claimed in claim 1, wherein the conversion of the first data stream to the predetermined commands comprises:
   when the first access commands request the flash storage device to read data from the predetermined files, the flash storage device converting the first data stream to a plurality of first symbols, and converting the first symbols to the first predetermined commands according to the command-symbol mapping table; and
   when the first access commands request the flash storage device to write data to the predetermined files, the flash storage device converting the first data stream to first data.

4. The method as claimed in claim 2, wherein the method further comprises the flash storage device processing the first data.

5. The method as claimed in claim 1, wherein sending of the first access commands comprises:
the host converting the predetermined commands to a plurality of second symbols according to the command-symbol mapping table;
the host generating a second data stream according to the second symbols; and
the host sequentially sending the first access commands for accessing the predetermined files corresponding to a plurality of second digits of the second data stream to the flash storage device.

6. The method as claimed in claim 5, wherein the first access commands request the flash storage device to write data to the predetermined files, and the method further comprises:
the host sending a series of second access commands for requesting the flash storage device to read the predetermined files corresponding to digits of second data, thus sending the second data to the flash storage device.

7. The method as claimed in claim 5, wherein the first access commands request the flash storage device to read data from the predetermined files, and the method further comprises:
the host sending a series of second access commands for requesting the flash storage device to write data to the predetermined files corresponding to the digits of second data, thus sending the second data to the flash storage device.

8. The method as claimed in claim 1, wherein the method further comprises:
when the host detects existence of the flash storage device, the host reading the flash storage device to determine whether the flash storage device has stored predetermined files;
when the flash storage device has the stored predetermined files, determining that the flash storage device can accept the first access commands; and
when the flash storage device does not have the stored predetermined files, determining that the flash storage device can not accept the first access commands.

9. A flash storage device, coupled to a host, comprising:
a flash memory, storing a plurality of predetermined files and a command-symbol mapping table, wherein each of the predetermined files corresponds to a digit, the command-symbol mapping table records a corresponding relationship between a plurality of symbols and a plurality of predetermined commands, and each of the symbols comprises a plurality of digits; and
a controller, receiving a plurality of access commands from the host, and when the access commands request the flash storage device to access the predetermined files, sequentially generating a plurality of first digits respectively corresponding to the predetermined files accessed by the access commands to obtain a first data stream, slicing the first data stream to generate a plurality of first symbols according to a digit number indicating the number of digits comprised by a symbol, converting the first symbols to a plurality of first predetermined commands according to the command-symbol mapping table, and performing operations according to the first predetermined commands.

10. The flash storage device as claimed in claim 9, wherein the controller converts the first data stream to a plurality of first symbols and then converts the first symbols to the first predetermined commands according to the command-symbol mapping table when the access commands request the flash storage device to write data to the predetermined files, and the controller converts the first data stream to first data when the access commands request the flash storage device to read data from the predetermined files.

11. The flash storage device as claimed in claim 9, wherein the controller converts the first data stream to the first symbols and then converts the first symbols to the first predetermined commands according to the command-symbol mapping table when the access commands request the flash storage device to read data from the predetermined files, and the controller converts the first data stream to first data when the access commands request the flash storage device to write data to the predetermined files.

12. A data storage system, comprising:
a host, sending a series of first access commands for accessing a plurality of predetermined files to a flash storage device; and
the flash storage device, coupled to the host, storing the plurality of predetermined files and a command-symbol mapping table, sequentially generating a plurality of first digits respectively corresponding to the predetermined files accessed by the first access commands to obtain a first data stream, slicing the first data stream to generate a plurality of first symbols according to a digit number indicating the number of digits comprised by a symbol, converting the first symbols to a plurality of first predetermined commands according to the command-symbol mapping table, and performing operations according to the first predetermined commands,
wherein each of the predetermined files corresponds to a digit, the command-symbol mapping table records a corresponding relationship between a plurality of symbols and a plurality of predetermined commands, and each of the symbols comprises a plurality of digits.

13. The data storage system as claimed in claim 12, the flash storage device converts the first data stream to a plurality of first symbols and then converts the first symbols to the first predetermined commands according to the command-symbol mapping table when the access commands request the flash storage device to write data to the predetermined files, and the flash storage device converts the first data stream to first data when the access commands request the flash storage device to read data from the predetermined files.

14. The data storage system as claimed in claim 12, wherein the flash storage device converts the first data stream to the first symbols and then converts the first symbols to the first predetermined commands according to the command-symbol mapping table when the access commands request the flash storage device to read data from the predetermined files, and the flash storage device converts the first data stream to first data when the access commands request the flash storage device to write data to the predetermined files.

15. The data storage system as claimed in claim 12, wherein the host converts the predetermined commands to a plurality of second symbols according to the command-symbol mapping table, generates a second data stream according to the second symbols, and sequentially sends the first access commands for accessing the predetermined files corresponding to a plurality of second digits of the second data stream to the flash storage device.

16. The data storage system as claimed in claim 15, wherein the first access commands request the flash storage device to write data to the predetermined files, and the host sends a series of second access commands for requesting the flash storage device to read the predetermined files corresponding to the digits of second data, thus sending the second data to the flash storage device.

17. The data storage system as claimed in claim 15, wherein the first access commands request the flash storage device to read data from the predetermined files, and the host sends a series of second access commands for requesting the flash storage device to write data to the predetermined files corresponding to the digits of second data, thus sending the second data to the flash storage device.

18. The data storage system as claimed in claim 12, wherein the host reads the flash storage device to determine whether the flash storage device has stored predetermined files when the host detects existence of the flash storage device, the host determines that the flash storage device can accept the first access commands when the flash storage device has the stored predetermined files, and the host determines that the flash storage device can not accept the first access commands when the flash storage device does not have the stored predetermined files.

* * * * *